United States Patent [19]
Huguenin et al.

[11] Patent Number: 5,760,397
[45] Date of Patent: Jun. 2, 1998

[54] MILLIMETER WAVE IMAGING SYSTEM

[76] Inventors: G. Richard Huguenin; Ellen Moore, both of 1C Adams Ct., South Deerfield, Mass. 01373; Robert Kolodzinski, 411 Burts Pit Rd., Northampton, Mass. 01060; John E. Kapitzky, 59 Pioneer Knolls, Florence, Mass. 01060

[21] Appl. No.: 651,243

[22] Filed: May 22, 1996

[51] Int. Cl.$^6$ ........................................ G01S 13/89
[52] U.S. Cl. .................. 250/332; 250/336.1; 342/179
[58] Field of Search ................... 250/332, 334, 250/336.1; 342/175, 179; 343/753, 754, /755

[56] References Cited

U.S. PATENT DOCUMENTS

| | | | |
|---|---|---|---|
| 5,047,783 | 9/1991 | Hugenin | 342/179 |
| 5,227,800 | 7/1993 | Huguenin | 342/179 |
| 5,455,589 | 10/1995 | Huguenen et al. | 342/175 |

*Primary Examiner*—David P. Porta
*Assistant Examiner*—Richard Hanig
*Attorney, Agent, or Firm*—Dickstein Shapiro Morin & Oshinsky LLP

[57] ABSTRACT

A millimeter wave detection and image generation system utilizing folded optics for reduced size. Means for scanning a received image over a radiation detection array, to improve resolution, is provided. Autofocusing of objects in the field of view of the millimeter wave detection and image generation system is also provided.

33 Claims, 13 Drawing Sheets

MILLIMETER WAVE IMAGING SYSTEM

FIELD OF THE INVENTION

The present invention relates to a millimeter wave imaging system. More particularly, the present invention relates to a compact camera for detecting millimeter wavelength radiation and generating images therefrom.

BACKGROUND OF THE INVENTION

Plastic weapons and explosives concealed under clothing present unique challenges to conventional contraband detection technology. Non-metallic, non-magnetic objects cannot be detected by conventional systems that use low frequency magnetic fields. Common techniques that can reveal these types of contraband involve x-rays or other ionizing radiation. These techniques are, or are perceived to be, hazardous and thus, their use has been limited.

It is known, however, that all objects naturally emit and reflect a broad spectrum of electromagnetic radiation. The level of radiation emitted or reflected by an object is determined by a number of factors such as the material and surface properties of the object and by its temperature. It is also known that the human body is an especially good emitter of millimeter waves, i.e., electromagnetic radiation characterized by wavelengths in the range of 1 to 10 millimeters with corresponding frequencies of 300 GHz to 30 GHz. By contrast, metal objects are very poor emitters and excellent reflectors of millimeter waves. Dielectric objects such as plastics, ceramics, plastic explosives, powdered drugs, etc., have emission properties that are between those of the human body and metals. Most clothing and many building materials are virtually transparent to millimeter waves.

Since all objects either reflect or emit millimeter waves, two different techniques have evolved to exploit one or the other of these properties. Passive imaging utilizes a camera with high sensitivity to detect the natural millimeter wave emissions from objects or people, and requires a sensitive receiver to distinguish small differences in emissions. The emitted radiation is processed by receivers in the camera, which convert the millimeter wave signal down to video. The strength of the video signal is roughly proportional to the power level in the emitted radiation. Different video signal strength is encoded to be displayed as pixels ranging from black through gray to white on a visual display.

A hidden plastic weapon in a person's clothing stands out as a dark (bright) silhouette against a bright (dark) body. Whether the warm body is dark or bright depends on the data acquisition program. Passive imaging is preferred when (1) irradiating living subjects is unacceptable and (2) when the user does not want to cause transmissions from the imaging system which could be detected by a monitor. The imaging system described in this disclosure is a passive imaging camera.

Active imaging takes advantage of reflection of millimeter waves from objects or people. In this method the user transmits signal from a millimeter wave generator to the subject under investigation. The millimeter waves are reflected back to the camera, where they are downconverted to video signal, and processed to pixels of varying intensity or color on a display. The transmitted signal which illuminates the subject may be attached to the camera or it may be set up separately. Active imagers may use the same high sensitivity camera as is used in passive imaging.

The foregoing properties have been exploited in systems utilizing millimeter waves for contraband detection. Examples of such systems are described in the following U.S. Patents.

U.S. Pat. No. 5,227,800 discloses an active imaging millimeter wave contraband detection system. In that system, millimeter wave generators are provided for illuminating objects in the field of view of a millimeter wave camera. Millimeter waves reflected off objects in the field of view are received by the camera module and processed in a focal plane receiver array. Signal strength measurements by each element in the array are used in forming an image of objects in the field of view.

U.S. Pat. No. 5,047,783 discloses a millimeter wave passive imaging system having improved image resolution. A rotating refractive wedge is provided to redirect the signal energy incident on the focal plane array. In redirecting the signal energy the area sampled by each element of the focal plane array is expanded. Image resolution is thereby improved by processing the signals in this expanded area.

While the foregoing systems represent significant advances over other prior art imaging techniques, such systems are often not well suited for use in a compact unit. Thus, the image resolution techniques of the prior systems require additional lenses and motors and thus result in increased size and complexity.

SUMMARY OF THE INVENTION

The present invention satisfies to a great extent the foregoing need for a compact millimeter imaging system by providing a method of forming an image based on incoming millimeter wavelength radiation wherein a signal received at a first surface of a transreflector plate is filtered by the transreflector plate so that only those signals having a preselected polarization are passed; the polarized signals are then reflected and the polarization sense is rotated ninety degrees by a load switching twist reflector; the reflected rotated polarized signals are reflected from a second surface of the transreflector plate and then received and detected at a radiation detector assembly. The signals received and detected at the radiation detector assembly are used to generate an image. Resolution of the image is improved by scanning the load switching twist reflector to redirect the reflected rotated polarized signals over an array of detectors. Piezoelectric transducers may be used to move the load switching twist reflector to produce the scanning.

In another aspect of the invention, the distance between the transreflector plate and the load switching twist reflector is adjusted to focus the reflected rotated polarized signals on the radiation detector assembly. This adjustment can be performed using an ultrasonic range sensor to measure the distance to the subject under investigation.

In its apparatus aspects, an imaging system is provided having a millimeter wavelength bandpass filter for passing signals of a predetermined frequency in the range of 30 gigahertz (GHz) to 300 GHz. A transreflector plate having a polarized filtering first surface is provided for filtering the bandpass filtered signal to pass signals of a predetermined polarization. A layered load switching twist reflector having a reflecting layer and a polarization rotating layer reflects and rotates the polarized signals filtered by the transreflector. The reflected and rotated signals are then reflected from a reflective second surface of the transreflector and received and detected by a radiation detector assembly. Piezoelectric transducers are mounted to the load switching twist reflector and operated to improve resolution of the image by moving the twist reflector to redirect and thus scan a received image over the radiation detector assembly. Other embodiments may use voice coils or linear motors in place of the piezoelectric transducers.

Adjustment means may also be provided in the foregoing system for adjusting the distance between the transreflector and the load switching twist reflector to focus the signals received at the radiation detector assembly.

One object of the present invention is to provide a compact contraband detecting imaging system for generating millimeter wave images for detecting nonmetallic, nonmagnetic objects in addition to metallic objects, and to provide a mechanism for redirecting an image received at an array of radiation detectors to improve image resolution.

It is another object of the invention to provide a millimeter wave camera as described in the preceding paragraph with folded optics for reducing the size of the camera.

It is another object of the invention to provide a millimeter wave imaging system which has a mechanism for automatically focusing the system.

These and other objects, advantages, and features of the invention will become more readily apparent, and the nature of the invention may be more clearly understood, by reference to the following detailed description of the invention, the appended claims, and to the several drawings attached herein.

DETAILED DESCRIPTION OF A PREFERRED EMBODIMENT OF THE PRESENT INVENTION

Figure 3:
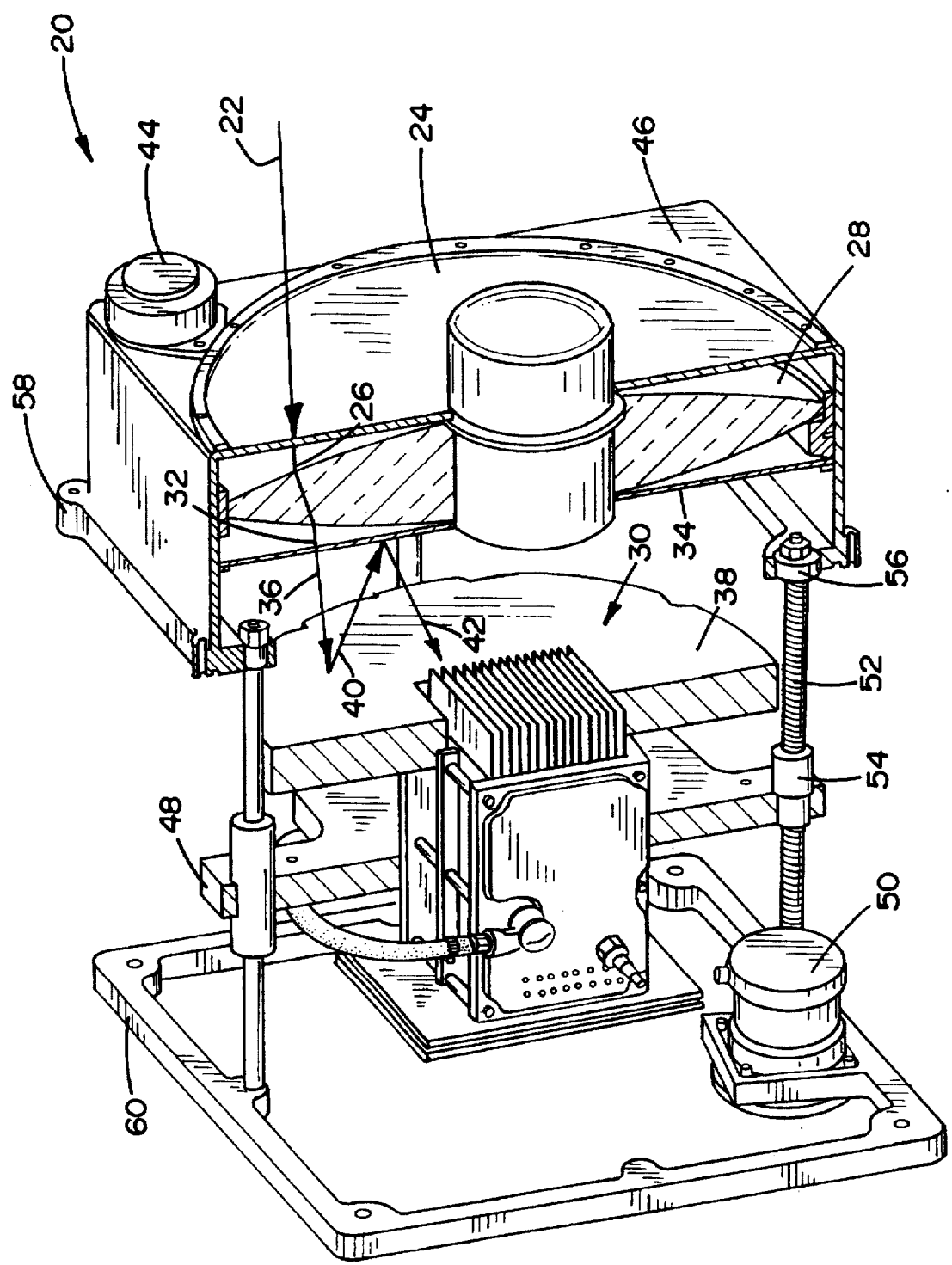
FIG. 3 is a partial cutaway perspective view of a millimeter wave camera of a preferred embodiment of the present invention.

Referring now to the Figures wherein like reference numerals indicate like elements. FIG. 3 shows a millimeter wave camera 20 in accordance with a preferred embodiment of the present invention. The millimeter wave camera 20 of FIG. 3 is designed to receive millimeter wavelength radiation from objects in the field of view of the camera and generate images therefrom.

Figure 1:
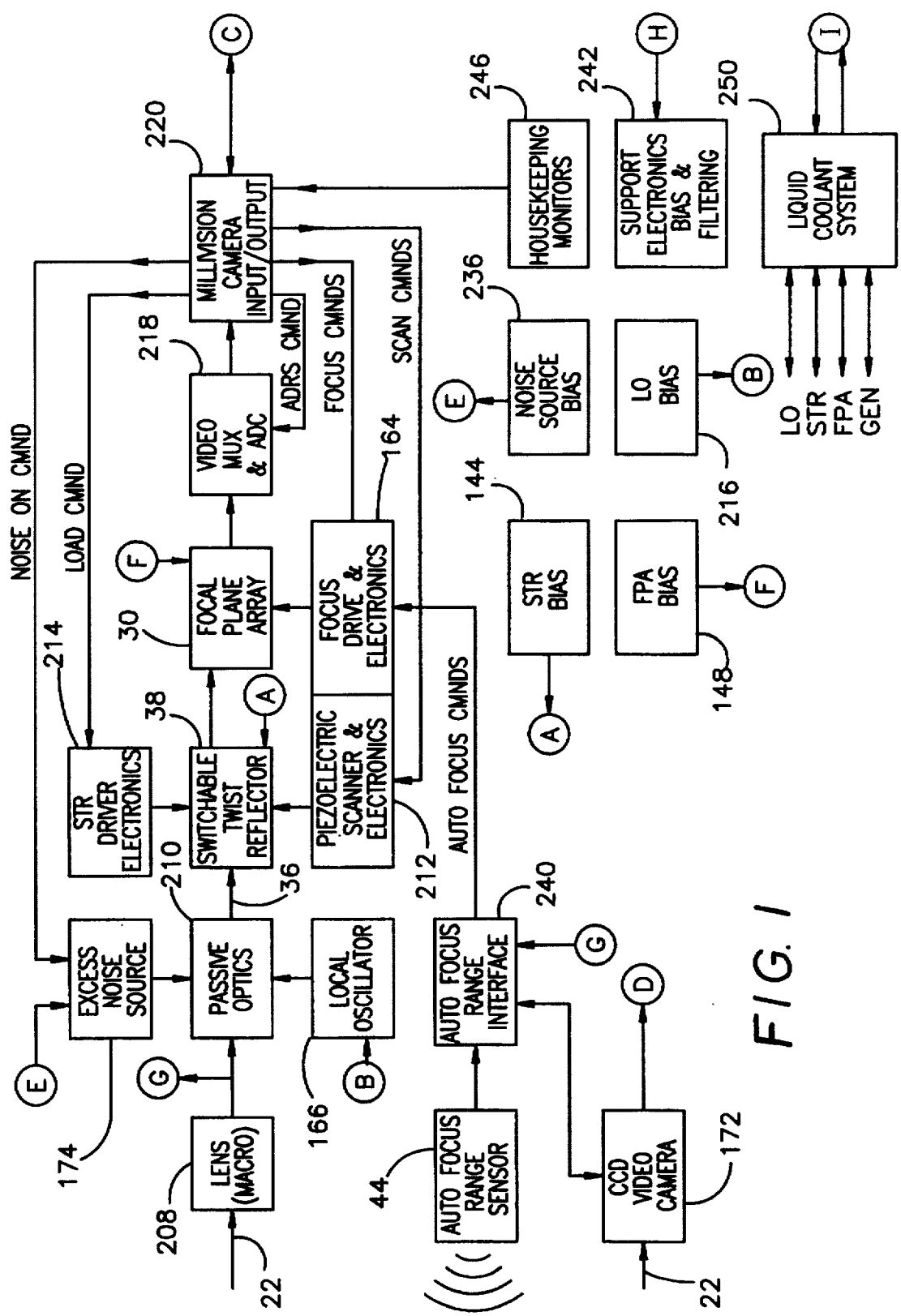
FIG. 1 a block diagram representation of the millimeter wave camera of a preferred embodiment of the present invention.
Figure 2:
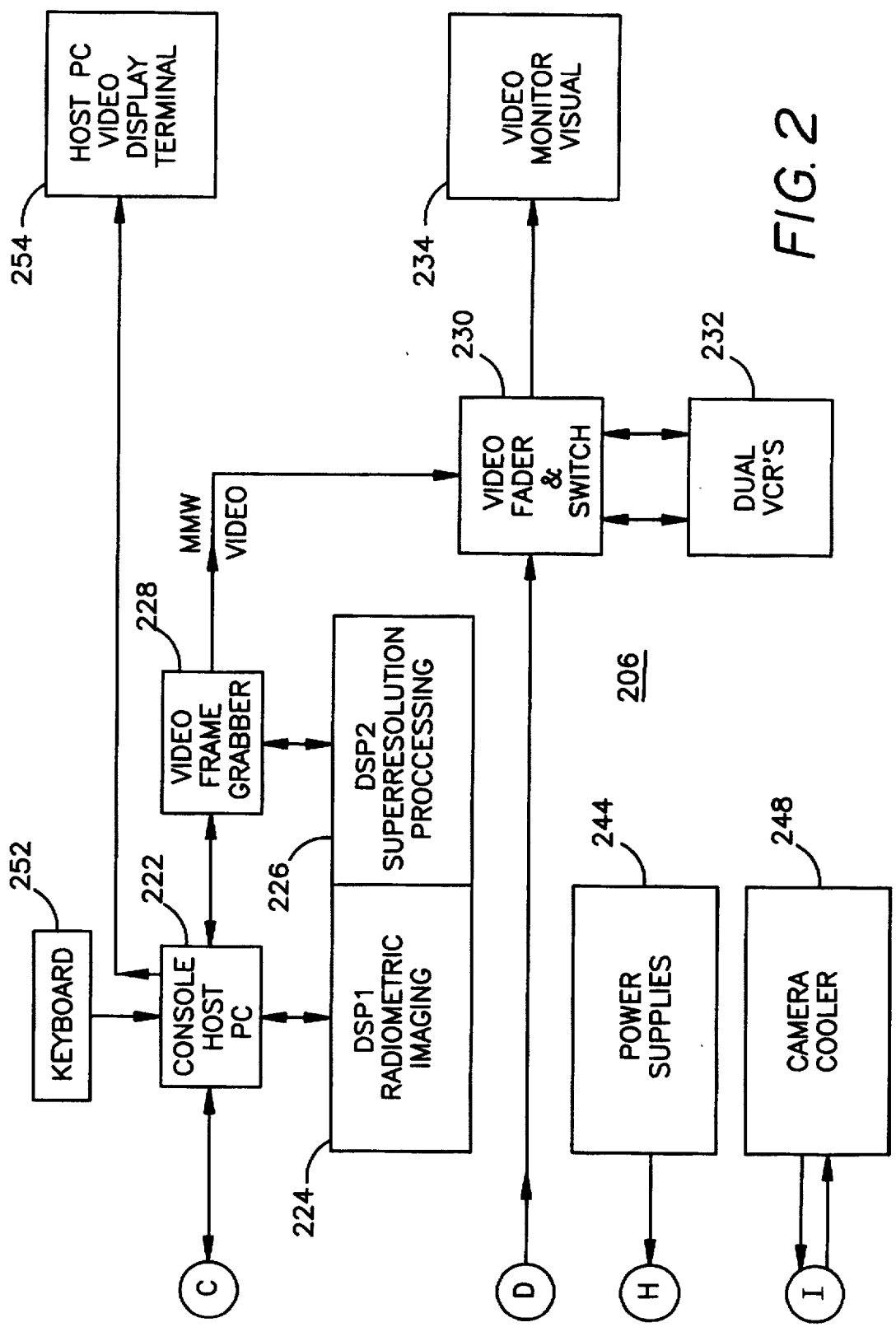
FIG. 2 is a block diagram representation of a console unit in accordance with a preferred embodiment of the present invention.

Shown in FIGS. 1 and 2 are block diagram representations of the optical, electrical, autofocus and coolant systems of a millimeter wave camera system in accordance with a preferred embodiment of the present invention. The millimeter wave camera system comprises the millimeter wave camera 20, FIG. 1, and a console unit 206, FIG. 2, for supplying power and control signals to the millimeter wave camera 20 and for outputting images generated by the system.

Addressing first the optical system, in FIG. 1, radiation 22 from the field of view is received first at a macro lens 208. In the present embodiment of the invention, the macro lens is an add-on lens which is provided to extend the focal range of the millimeter wave camera 20. The radiation from the field of view is transmitted next to the passive optics 210 of the millimeter wave camera 20, either directly or via the macro lens 208. The passive optics 210 includes the bandpass filter 24, lens 28 and transreflector plate 34, the operation of which will be described below in connection with FIG. 3.

When millimeter wave images are to be generated, the signals 36 (FIG. 1) passed through the passive optics 210 are transmitted then to the switchable twist reflector 108 (FIG. 7) of the load switching twist reflector 38 (FIG. 1). The switchable twist reflector 108 is biased, via the voltage source 144, to reflect the signals 36. The reflected signals are then transmitted to the focal plane array 30 for processing by the array antennas. The piezoelectric transducer assemblies 212 are connected to the load switching twist reflector 38 to improve resolution of the images received at the focal plane array, during generation of millimeter wave images, in accordance with the method described below in connection with FIG. 7. The switchable twist reflector 108 includes a diode array 133 (FIG. 8) which is biased under control of signals transmitted from the console 206 (FIG. 2) via the STR driver 214.

The signals 36 reflected from the switchable twist reflector 108 and received at the focal plane array 30 include the radiation signals from the field of view as well as a locally oscillated signal of approximately 47 GHz generated by the local oscillator 166. The local oscillator signal is combined with the radiation signals from the field of view in the focal plane array 30. As described below in connection with FIG. 12, the local oscillator signal serves to down convert the radiation signals 22 received from the field of view to approximately 2.5 GHz. Power is supplied to the local oscillator 166 by the local oscillator bias supply 216.

The signals as processed in the focal plane array 30 are transmitted next to a video multiplexer 218 wherein the signals are packaged for transmission and processing at the console 206 (FIG. 2). These signals are transmitted to the console through the millimeter wave camera input output ports 220 (FIG. 1). At the console 206, as shown in FIG. 2, the packaged signals are stored in the console host computer 222, wherein they can be operated upon by a radiometric imaging processor 224.

The radiometric imaging processor is responsible for performing five operations, including: 1) controlling the data acquisition hardware (i.e., A/D converters, load switching twist reflector 38 (FIG. 1), noise generator 174 and piezoelectric transducers 212) in response to commands from the host computer, 2) sequencing and digitizing data during the load, noise and sixteen scanned positions' portion of a data frame, 3) calibrating the data of the sixteen scanned positions via information collected during the load and noise portions of the data frame, 4) arranging all of the data into a coherent image, and 5) placing the final image in a buffer, not shown, for image processing and transmission for display.

Referring now to FIG. 3, the structure and operation of the millimeter wave camera components are described herein with reference to radiation signals, generally designated by reference character 22, received from the field of view. The radiation signals 22, emitted by an object in the field of view, are incident first upon a band pass filter 24 of the millimeter wave camera 20. The band pass filter 24 permits millimeter wavelength signals 26 of a desired frequency range to pass while blocking signals outside the desired frequency range. In the present embodiment, the band pass filter 24 is selected to pass signals in the frequency range of 91.5 GHz to 96.5 GHz.

The signals 26 that pass through the band pass filter 24 are then focused by a lens 28 for transmission to a focal plane array 30. The lens 28 of the present embodiment of the invention is a biconvex hyperbolic type lens selected for focusing millimeter wavelength radiation in the desired wavelength range.

Prior to being received at the focal plane array 30, however, the focused signals 32 are transmitted to a transreflector plate 34. The transreflector plate 34 is polarized to permit only those signals 36 having a desired polarization (i.e. vertical, horizontal or circular) to pass through. The millimeter wavelength signals that do not have the desired polarization are reflected by the transreflector plate 34. In the camera of the present embodiment the transreflector plate 34 is selected to pass vertically polarized signals.

The polarized signals 36, passed by the transreflector plate 34, are incident upon and reflected from a switchable twist reflector 108 (FIG. 7) of a load switching twist reflector 38. In addition to reflecting the polarized signals, the switchable twist reflector 108 shifts the polarization of the reflected signals by ninety degrees, resulting in rotated polarized signals 40.

The rotated polarized signals 40 are transmitted back to the transreflector plate 34 and, since they are horizontally polarized, are reflected from the transreflector plate 34. The reflected, rotated polarized signals 42 are then transmitted to the focal plane array 30 where the millimeter wave signals are detected.

The focal plane array 30 of the millimeter wave camera of FIG. 3 is preferably a 16×16 element array. These 256 elements are scanned in a 4×4 raster scan (see FIG. 13) to produce 4096 pixels. The 4096 pixels are processed to produce an image having 1024 pixels. The resolution (see FIG. 14) of the processed image is 3 mm×3 mm at a distance of 0.5 m, and 19 mm×19 mm at a distance of 3.0 m.

Figure 4:
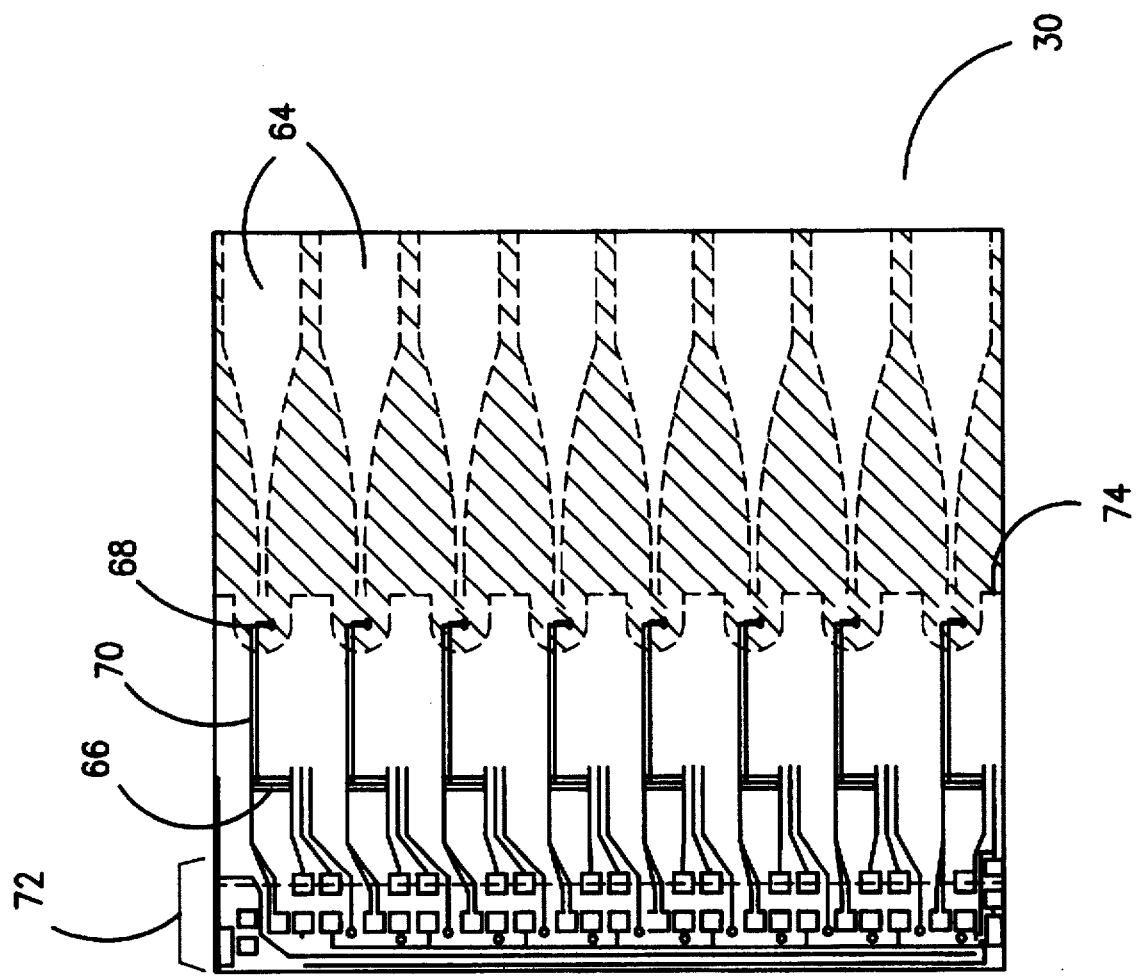
FIG. 4 is a plan view of a portion of the focal plane array of the millimeter wave camera of FIG. 3.

The focal plane array 30 is constructed from a layer dielectric such as Duroid™ (Rogers Corporation) with metalization on both sides. The antennas 64 and circuits are made by etching away the metal in the appropriate pattern. FIG. 4 shows the RF portion of the focal plane array 30, which is in two separate layers. The linearly tapered slot antennas 64 are outlined in dashed lines because they are on the back side of the circuit. The cross hatching denotes metalization on the back sides, while the areas without cross hatching are dielectric. The top side of the antenna portion has no metalization. The antenna array in this circuit has slotline architecture. Such antennas 64 are referred to in the art as "endfire traveling wave slot antennas," as originally described by P. J. Gibson, "The Vivaldi Aerial," *Proc. of the European Microwave Conf.*, Brighton, UK (1979), pp. 101-105.

Figure 5:
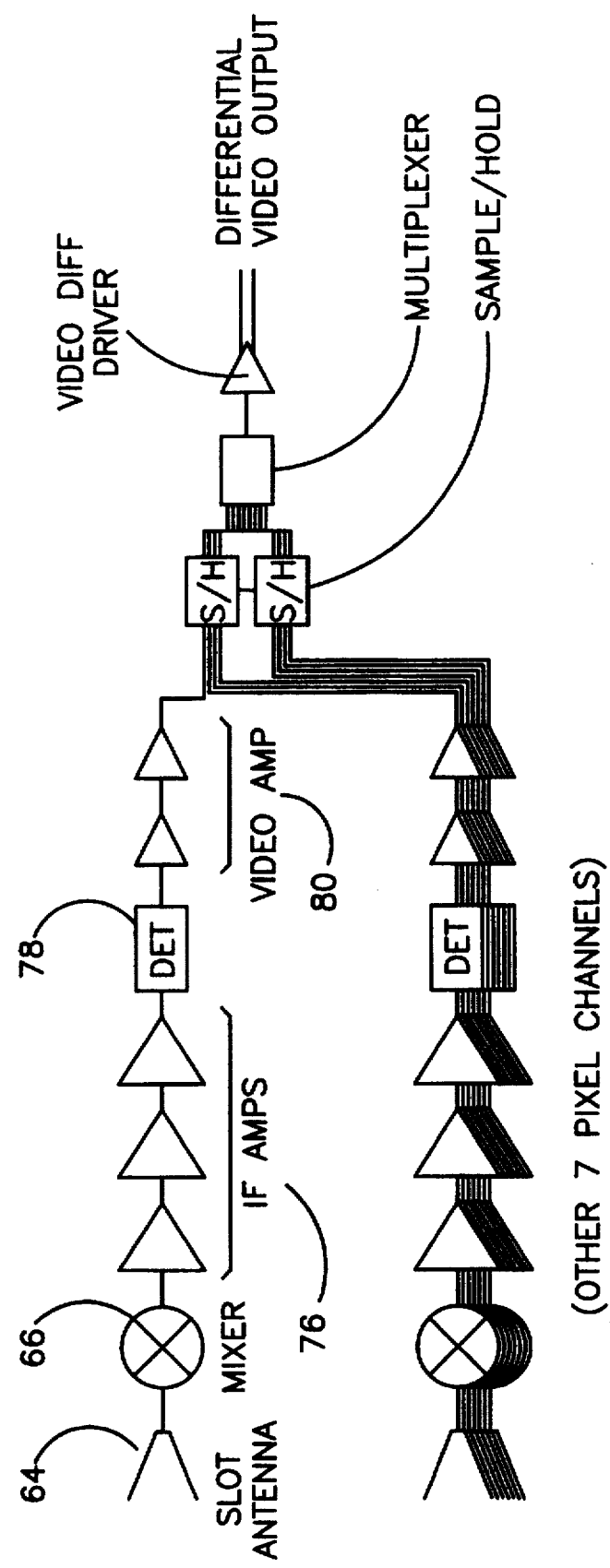
FIG. 5 is a block diagram of the focal plane array signal processing circuitry.

The rest of the RF circuit uses microstrip architecture. As shown in FIG. 4, the circuit elements are metal on a dielectric background, with a ground plane under the whole portion. The electric field is coupled from the antenna to the mixer 66 via a transition 68 and a transmission line 70. D.C. bias is applied to the mixer by the bias pads and lines 72. The intermediate frequency (IF) portion of the circuit extends to the left of the bias pads and contains, as shown in greater detail in FIG. 5, the IF amplifiers 76, detectors 78, and video amplifiers 80. The differential video output comes out of the millimeter camera output 220 (FIG. 1), and is applied through the console host 222 (FIG. 2) to the video output device 228 (FIG. 2). The FIG. 4 circuit board is a standard printed circuit board which also contains circuit elements and I.C.'s needed to form the focal plane array processing circuit depicted in FIG. 5. The back side of the IF portion of the dielectric circuit is completely metalized to form a ground plane. The IF and microstrip RF portions of the focal plane array 30 are mounted to a metal tray 74 for stiffness. The metal trays 74 are stacked in a precise spacing to form focal plane array 30, as shown in FIG. 3, so that the correct horizontal and vertical distance between antennas 64 is maintained. The antennas 64 extend out beyond the metal trays 74 (FIG. 4).

The focal plane array 30 which may be used in the system of the present invention is of the type described in U.S. Pat. No. 5,227,800, issued Jul. 13, 1993 and U.S. Pat. No. 5,202,692, issued Apr. 13, 1993 the disclosures of which are incorporated herein by reference.

The passive millimeter wave camera of this invention must detect weak signals. To enhance weak signals, filter out unwanted noise, and get high dynamic range, the focal plane array has a superheterodyne receiver at each of the antennas 64. This type of receiver is described by Tiuri, M. E., "Radio Telescope Receivers", Ch. 7, *Radio Astronomy*, by Kraus, J. D., at 236–293 (McGraw-Hill 1966).

Figure 11:
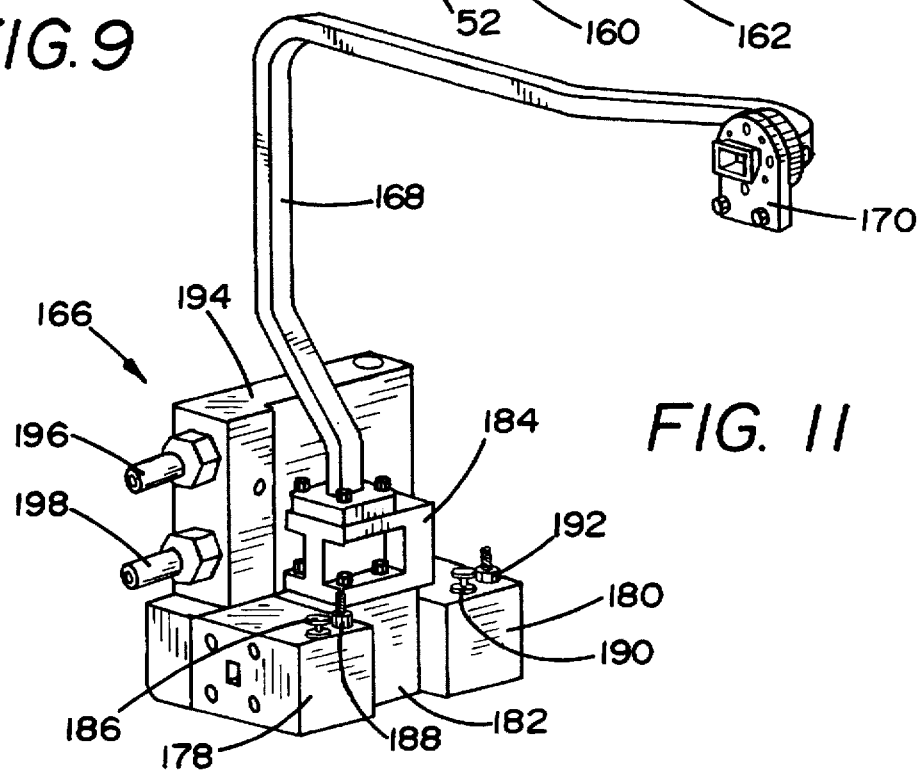
FIG. 11 is a perspective view of the local oscillator of the millimeter wave camera of FIG. 10.

The superheterodyne receiver has a subharmonic mixer and local oscillator 166 (see FIG. 11). The bandwidth of the incoming millimeter wave signal spans 91.5 GHz to 96.5 GHz. The local oscillator signal of approximately 47 GHz is multiplied up to approximately 94 GHz, and is mixed with the upper and lower sidebands of approximately 2.5 GHz bandwidth. In other words, this camera has a double sideband receiver with an IF of approximately 2.5 GHz. The local oscillator signal is launched from a feed 170 and is detected by the focal plane array 30 (FIGS. 3, 4) without reflecting from the load switching twist reflector 38 (FIG. 3) or the transreflector plate 34.

The use of local oscillators in this manner, in millimeter wave cameras, is well know in the art and is described in a number of U.S. Patents including U.S. Pat. No. 5,227,800, issued Jul. 13, 1993 and U.S. Pat. No. 4,910,528, issued Mar. 20, 1990, the disclosures of which are incorporated herein by reference.

As shown in FIG. 11, in the present embodiment the local oscillator consists of two signal generators 178, 180. Each signal generator produces a signal of approximately 47 GHz. The power of each signal generator 178, 180 is combined in power combiner 182 to produce a single approximately 47 GHz signal having the combined power of each of the signal generators 178, 180. The phase of each of the signal generators 178, 180 is locked by the process of injection locking whereby leakage between the two signal generator sources is used to lock the phase.

The combined signal of approximately 47 GHz is passed through an isolator 184 to suppress unwanted reflections.

The signal is then provided via a wave guide 168 to a horn antenna 170 for transmission to the focal plane array 30. Electrical leads 186, 188, 190, 192 are provided for driving signal generators 178, 180. Further, a cooling block 194 is provided for dissipating heat generated by the signal generators 178, 180. Water, or other suitable fluid, is provided into the cooling block 194 through input hose fitting 196. The fluid passes through a channel, not shown, in the cooling block 194 before passing out of hose fitting 198.

Another aspect of the superheterodyne receiver of the focal plane array 30 is the process of load comparison, or Dicke switching, also described by Tiuri (Id.). The process of load comparison enables the effects of gain fluctuations to be compensated. The noise source 174 (FIG. 12) is at 94 GHz and is transmitted directly into the focal plane array antennas 64 (FIG. 4) without reflecting off the switchable twist reflector 108 (FIG. 7) of the load switching twist reflector 38 (FIG. 3) or off the transreflector 34 (FIG. 3). This occurs during that part of the duty cycle when the switchable twist reflector 108 is transmitting. The noise signal is received and detected by the focal plane array antennas 64 (FIG. 4). This noise signal is of a known strength and is used as a standard to measure the strength, or noise temperature, of all other incoming millimeter wave signal from the subject. During that part of the duty cycle when the noise is being detected, the switchable twist reflector 108 (FIG. 7) transmits the millimeter wave signal from the scene to the silicon carbide layer 128 (FIG. 7), where it dissipates.

Figure 12:
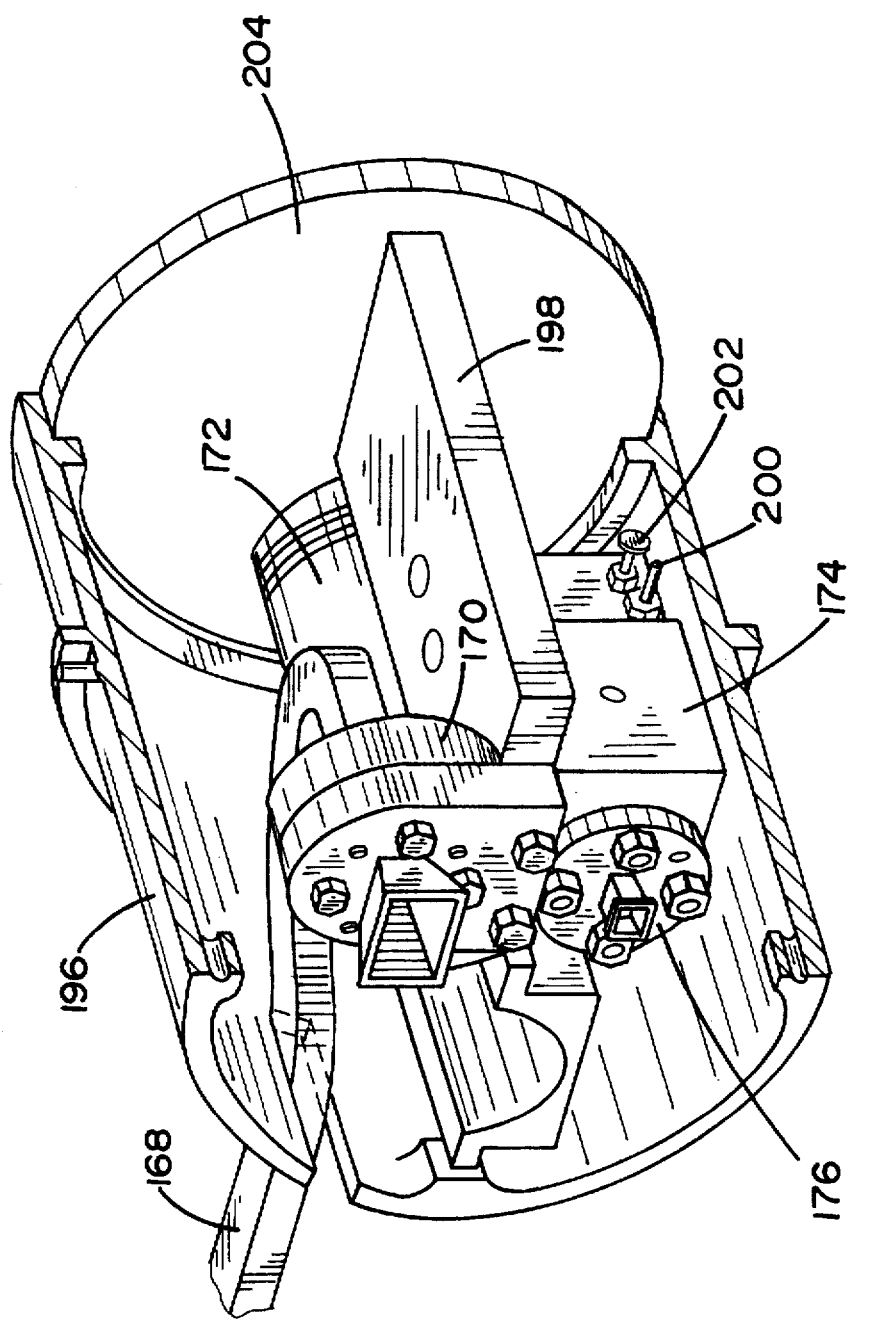
FIG. 12 is a partial cutaway perspective view of the CCD camera housing assembly of the millimeter wave camera of FIG. 10.

In operation, the noise generator 174 shown in FIG. 12 is used to normalize the gain between the antennas 64 of the focal plane array 30, FIG. 3. The normalization process is accomplished by first operating the load switching twist reflector 38, FIG. 3, to transmit the signals 36 received from the field of view. With the signals 36 from the field of view transmitted by the load switching twist reflector 38, no radiation from the field of view will be received at focal plane array 30. The noise generator 174 then transmits a signal, of a known level and having the same character as the signals being measured from the field of view, toward the focal plane array 30 via the horn antenna 176. When the signal having the known signal level is received at each of the antennas 64 of the focal plane array 30 the gain between channels can then be normalized. This process is commonly referred to as flat fielding. A metallized quartz disk 204 is provided to prevent the passage of RF frequencies which would otherwise interfere with the camera operation. In the preferred embodiment of the present invention of the quartz disk is gold plated.

Figure 7:
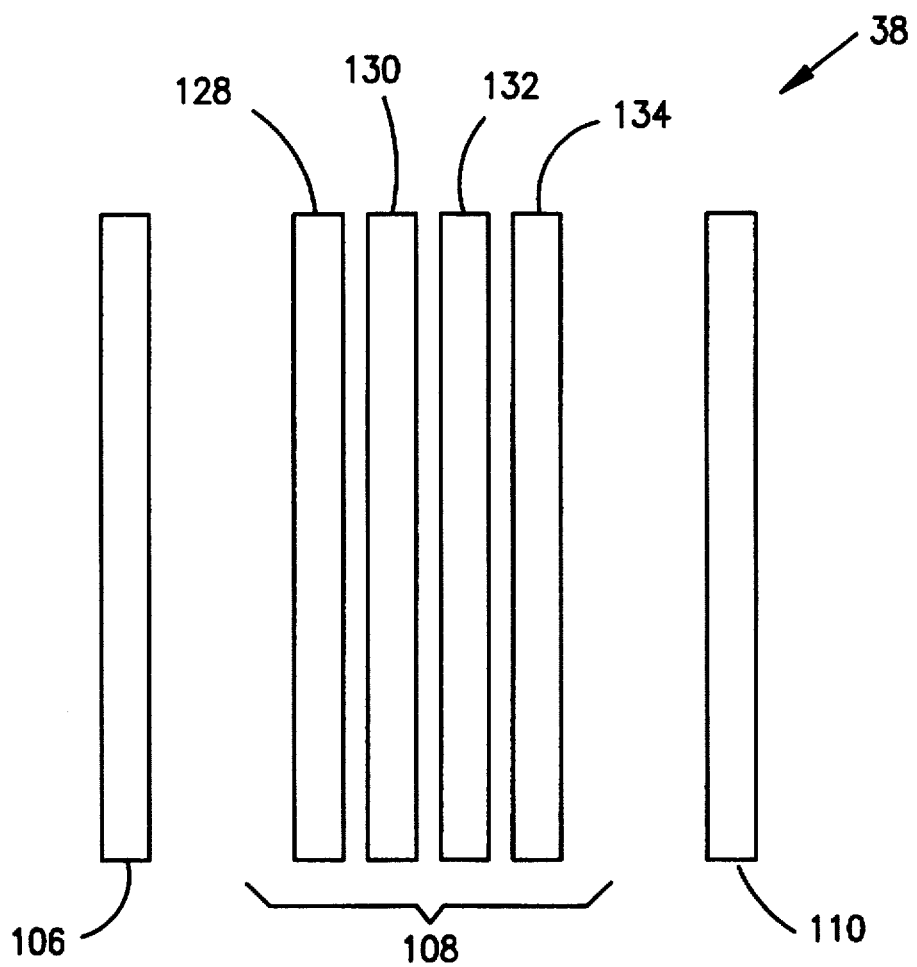
FIG. 7 is an exploded view of the load switching twist reflector of the millimeter wave camera of FIG. 3.

The load switching twist reflector 38, as shown in FIG. 7, is composed of three subcomponents: an aluminum plate 106, a switchable twist reflector 108 and a quasioptical load 107. The aluminum plate 106 serves as a mounting substrate for the switchable twist reflector 108 and quasioptical load 107, and as a base for connecting the bearing assemblies. The switchable twist reflector 108 consists of three sandwiched layers including a quasioptical monolithic tile array layer 132, a perforated plate filter 134, and a quarter wave plate 110. The quarter wave plate 110 operates to change the polarization state of the polarized signals 36 received from the transreflector plate 34. The switchable twist reflector 108 can be biased to reflect received signals or to transmit received signals. As will be described below, through the use of the switchable twist reflector 108, the radiation received at the focal plane array 30 can be switched between the load, i.e., radiation received from the field of view, and a known signal generated for use in adjusting the gain between antennas 64 of the focal plane array 30. The quasioptical load 107 comprises a silicon carbide layer 128 and a fused silica layer 130. The silicon carbide layer 128 is mounted to the aluminum plate 106.

Figure 8:
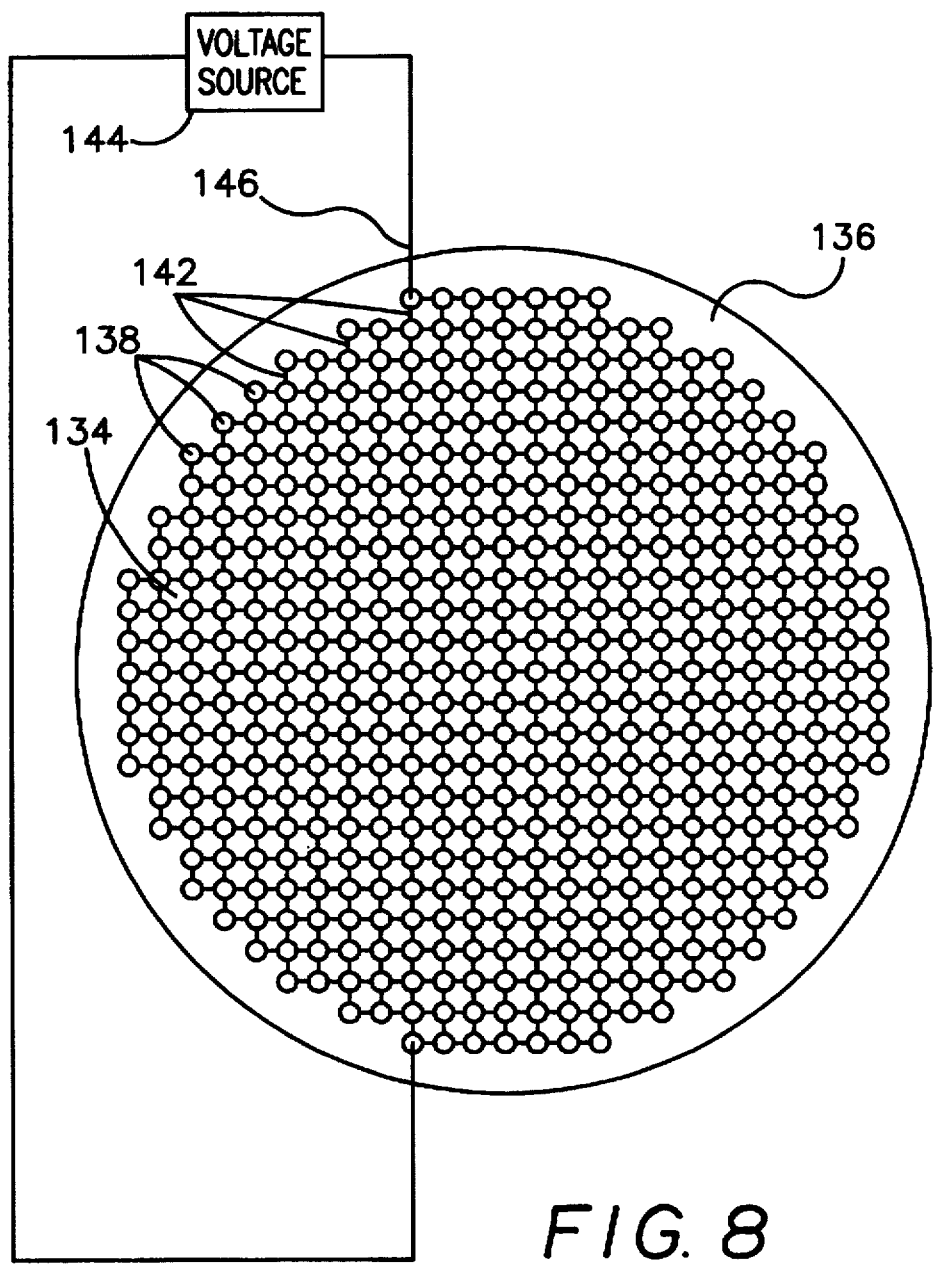
FIG. 8 is an illustration of a diode array of the load switching twist reflector of FIG. 7.

The millimeter wave radiation is transformed from linear vertical polarization to circular polarization by the quarter wave plate 110. It is then incident on the perforated plate high pass filter 134, which reflects all frequencies below the cutoff frequency, about 80 GHz. After reflection by the perforated plate filter 134, the beam is incident on the quasioptical monolithic tile array layer 132. FIG. 8 shows a diode array 133 that is on the surface of the monolithic tile array layer 132 which faces the lens 28 (FIG. 3). The diode array 133 employed is similar to that described in U.S. Pat. No. 5,170,169 and in the article "Quasi-Optical Millimeter Wave Hybrid and Monolithic PIN diode Switches," K. D. Stephan, P. H. Spooner and P. F. Goldsmith, IEEE Trans. *Microwave Theory Tech.*, vol. 41, pp. 1791–1798, Oct. 1993.

As shown in FIG. 8, the building blocks of the diode array 133 are 12.7×12.7 mm tiles comprising a GaAs substrate 135, a passive mesh on one side, and an active mesh on the other side. The mesh is a two-dimensional array of thin metal strips arranged in parallel and perpendicular fashion. The active mesh has a PIN diode 142 located between the nodes 138 of the mesh in both directions. The passive mesh has the identical metalization pattern as the active mesh, but has solid metalization in place of the PIN diodes 142. The active and passive meshes are fabricated onto the GaAs substrate 134. A mesh by itself is inductive, and performs as a high pass filter. Two passive meshes in series form a quasioptical bandpass filter.

The switching function of the diode array 133 is controlled by the PIN diodes 142. These devices have a high impedance when they are unbiased or reversed biased, and a very low impedance when forward biased. The monolithic tile array 132 transmits the millimeter wave signal when the diode array 133 is forward biased and reflects the signal when the diode array 133 is reverse or zero biased. The details of how the transmission and reflection works are described in U.S. Pat. No. 5,170,169.

The diodes 142 are biased by the voltage source 144 which connects to the bias leads 146 on the circuit board 136 surrounding the array of tiles. In the ON state the signals transmitted through the monolithic tile array layer 132 (FIG. 7) are received at the fused silica layer 130. The first surface of the fused silica layer 130 operates as a mounting surface for the printed circuit board 136 (FIG. 8) which provides the bias to the monolithic tile array 132. The fused silica layer 130 also serves as an antireflection layer to prevent the reflection of signals from the silicon carbide layer 128.

The signals transmitted through the monolithic tile array layer 132 are then received at the silicon carbide layer 128 which operates as a load material to absorb the transmitted signals. In addition, silicon carbide is a rigid material and thus the silicon carbide layer 128 is provided to allow the switchable twist reflector 108 to be driven by the piezoelectric transducers to high resonant frequencies which could not be achieved with the aluminum plate 106. The silicon carbide layer 128 also serves as a thermoconductor to dissipate heat generated by the diodes in the monolithic tile array layer 132.

Figure 9:
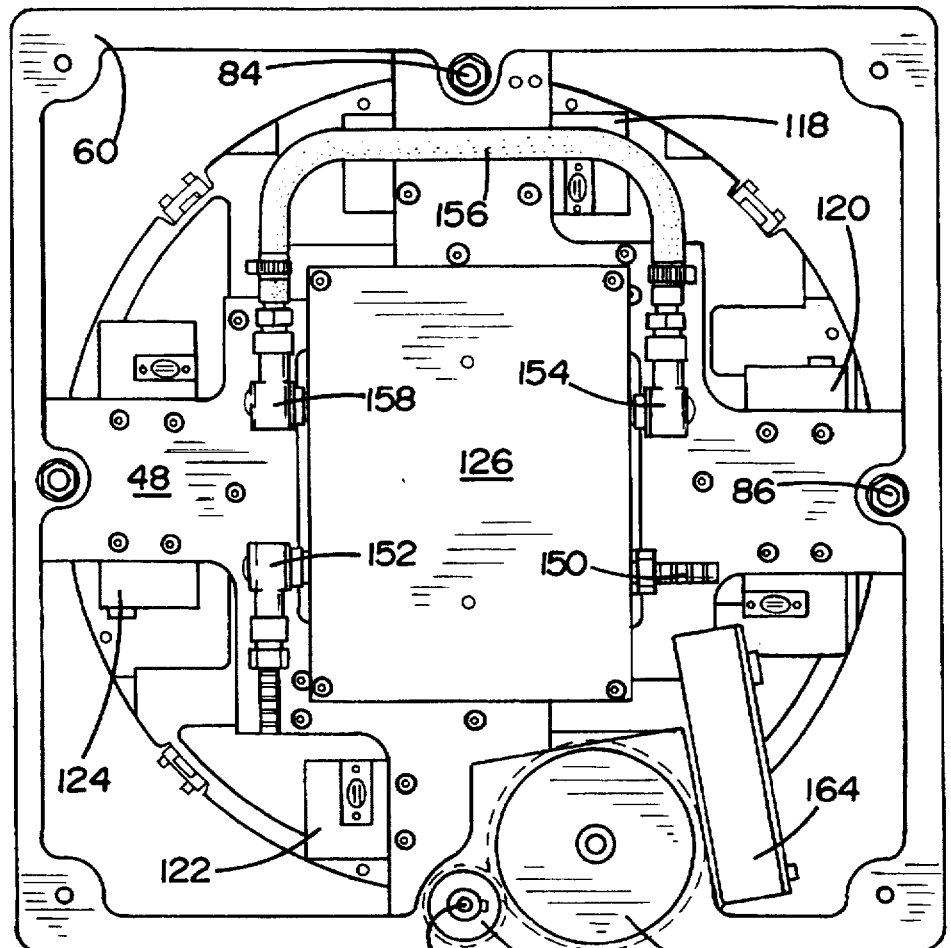
FIG. 9 is a rear elevation view of the millimeter wave camera of FIG. 3.

To facilitate the management of power requirements, the diode array layer 132 of the present embodiment is biased in quadrants. As shown in FIG. 9, four diode array drivers 118, 120, 122, 124, are provided for biasing the four quadrants of the diode array layer 132. A switchable twist reflector which may also be used in the millimeter wave camera of the present invention is of the type described in U.S. Pat. No. 5,170,169, issued Dec. 8, 1992, the disclosure of which is incorporated herein by reference.

As shown in FIG. 9, encasing the focal plane array 30 of the millimeter wave camera 20 is a cooling block 126. The cooling block 126 is mounted to the focal plane array mounting frame 48. When the focal plane array mounting frame 48 is shifted the focal plane array 30 (FIG. 3) is thereby also shifted. As heat is generated by the focal plane array 30, the fluid passing through the cooling block 126 absorbs and carries away the heat. A heat exchanger, not shown, is provided in the fluid conduit for dissipating the heat absorbed by the fluid. A pump, not shown, is also provided for circulating the fluid through the cooling block 126.

In operation, water, or other suitable fluid, is provided into the cooling block 126 through the inlet hose fitting 150. The fluid then passes through an internal channel, not shown, at one side of the cooling block 126 and then out of an outlet hose fitting 154. The fluid is transmitted, via a hose 156, to an inlet hose fitting 158 at the opposite side of the cooling block 126. The fluid then passes through a second internal channel, not shown, within the cooling block 126 and then out of the outlet channel 152.

Also shown in FIG. 9 is a drive gear 160 secured to the threaded rod 52. A second drive gear 162, secured to the focusing motor 50 (FIG. 3), drives the drive gear 160. A motor controller 164 provides drive signals to the focusing motor 50 to drive the threaded rod 52 to move the focal plane array mounting frame 48 forwardly or rearwardly. The drive signals provided to the focusing motor are generated by the motor controller 164 in response to the distance measurements generated using to ultrasonic focusing detector 44 (FIG. 3).

Figure 6:
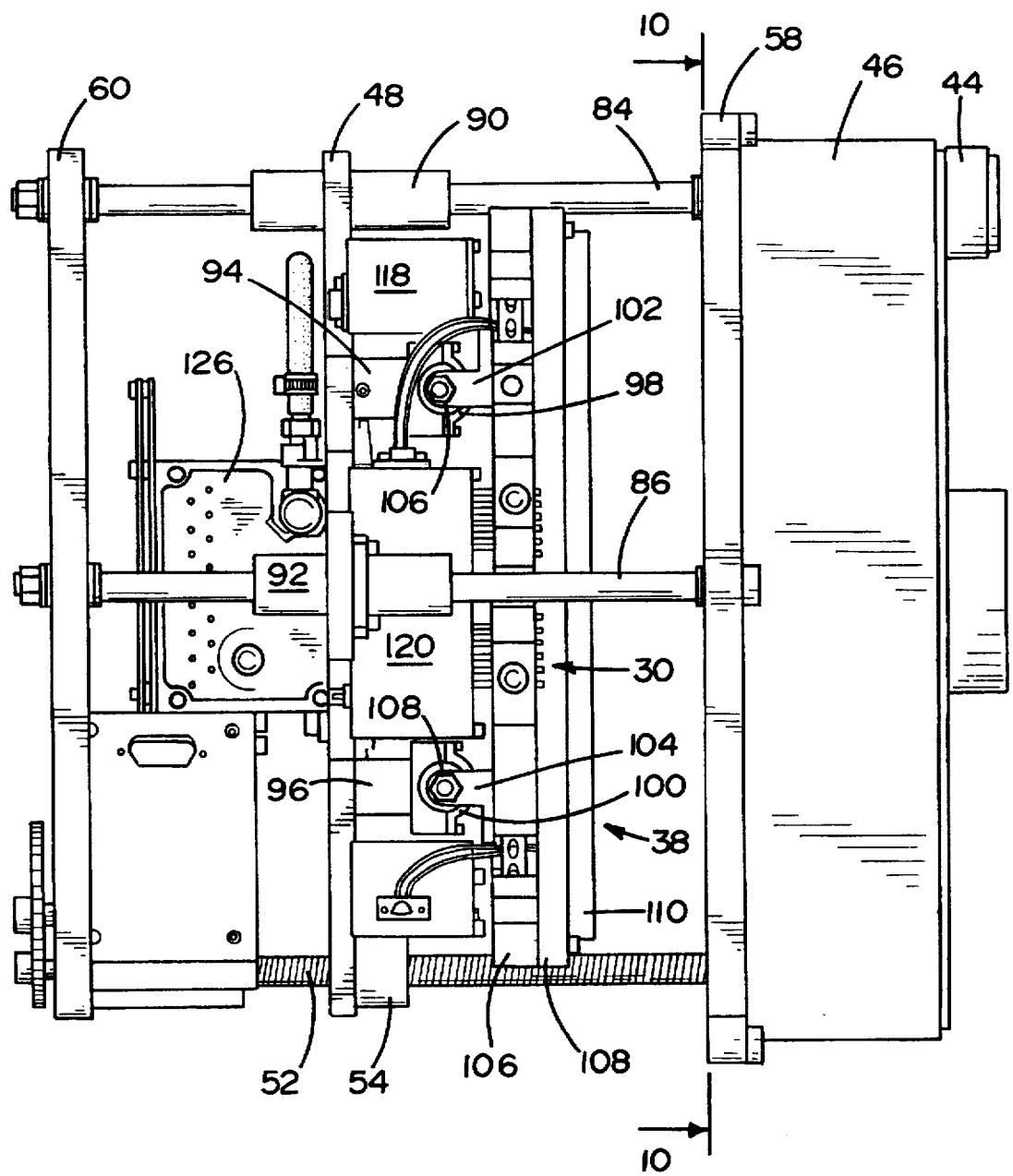
FIG. 6 is a side elevation view of the millimeter wave camera of FIG. 3.
Figure 10:
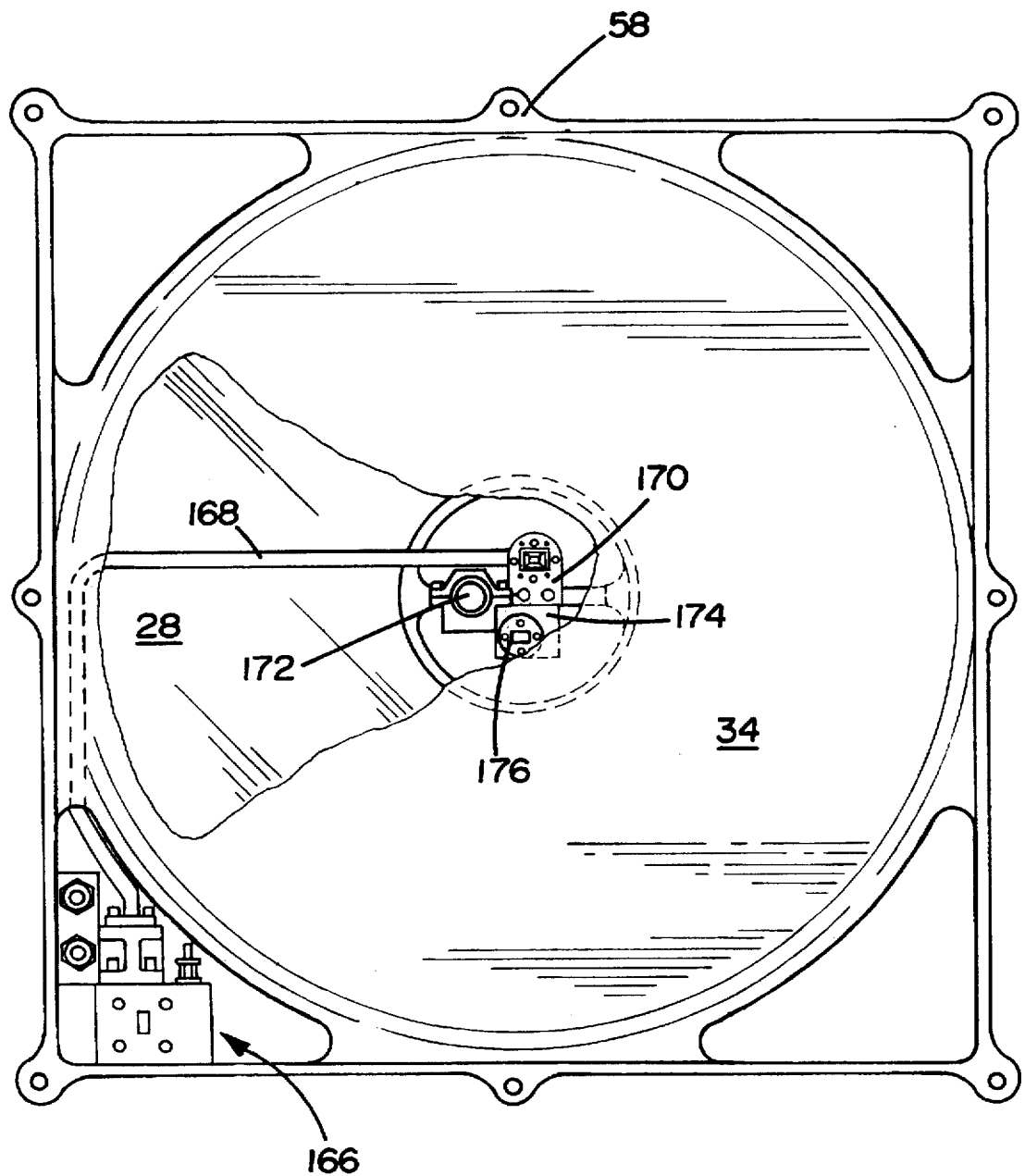
FIG. 10 is a cross-sectional view of the millimeter wave camera taken along the lines x—x of FIG. 6.

In FIG. 10 there is shown a sectional view of the millimeter wave camera 20 taken along lines x—x of FIG. 6. Contained within the lens housing 46 are a local oscillator assembly 166 with a wave guide 168 and a horn antenna 170, a CCD camera 172 and a noise generator 174 with a horn antenna 176. The operation of the local oscillator assembly 166 and the noise generator 174 have been described above with reference to FIGS. 11 and 12.

Referring now to FIG. 6, it is seen that the forward mounting frame 58 is secured to the rear mounting frame 60 by three securing rods (two of which are shown) 84, 86. The focal plane array mounting frame 48 is provided between the forward mounting frame 58 and rear mounting frame 60 and is provided with three holes for receiving securing rods 84, 86 (and the third securing rod, not shown) there through. A slide bearing 90 is provided on the securing rod 84 to facilitate smooth movement of the focal plane array mounting frame 46. Similarly, a slide bearing 92 is provided on the securing rod 86 and a slide bearing, not shown, is provided on the third securing rod, not shown.

Mounted to the focal plane array mounting frame 48 at the upper section and the lower section are piezoelectric transducers 94, 96. Mounted to each of the piezoelectric transducers, using a clamp 98, 100, is a bearing assembly 102, 104. Provided between the bearing assemblies 102, 104 and the piezoelectric transducers 94, 96 are spherical bearings 106, 105. The load switching twist reflector 38 is attached to the bearing assemblies 102, 104 thereby securing the load switching twist reflector unit 38 to the focal plane array mounting frame 48. Similarly, the load switching twist reflector 38 is secured at the left and right section of the focal plane array mounting frame 48 by piezoelectric transducers, not shown.

As seen in FIGS. 3 and 4, a finite distance exists between individual antennas 64 of the board of the focal plane array 30 and between individual boards of the focal plane array 30. Since signal strength measurements are made only for signals received at the individual antennas 64, no measurements are made in the area between the adjacent antennas 64 and between boards of the focal plane array 30. When any one of the upper 94, lower 96, left or right piezoelectric transducers of FIG. 6 is energized, the load switching twist reflector 38 is shifted to a different position causing the signal 40 (FIG. 3) reflected from the load switching twist reflector 38 to change its position as reflected onto the focal plane array 30.

With the four piezoelectric transducers provided in the present embodiment, sixteen different positions of the load switching twist reflector 38 are selectable. By cycling through the sixteen different positions, the image can thereby be scanned over the focal plane array 30. Since the scanning of the image over the antennas 64 translates to an image with of the area measured by each of the antennas 64, improved resolution is thereby achieved.

As seen in FIG. 3, by reflecting the signals from the load switching twist reflector 38 and transreflector 34, the focal length between the lens 28 and focal plane array 30 is maintained while the physical distance between the lens 28 and focal plane array 30 is reduced to approximately one third the focal length. It is readily understood how the foregoing folded optics arrangement reduces the length of the millimeter wave camera 20.

Further, in the millimeter wave camera 20 of the present embodiment, the focal distance between the lens 28 and the focal plane array 30 can be adjusted for autofocusing of objects in the field of view. In performing autofocusing, ultrasonic waves are emitted by an ultrasonic detector 44 mounted to the front of the housing 46 for the band pass filter 24, lens 28 and transreflector 34. These ultrasonic waves are reflected from objects in the field of view and received at the ultrasonic detector 44. The received ultrasonic waves are then processed, as will be discussed below with reference to FIGS. 1 and 2, to determine the required focal length for focusing images onto the focal plane array 30.

With the focal length determined, the focal plane array mounting frame 48, having the focal plane array 30 and load switching twist reflector 38 mounted thereon, is moved forwardly or rearwardly to focus the signals 42 onto the focal plane array 30. The focal plane array mounting frame 48 is moved via rotation of a focusing motor 50 which causes a threaded rod 52 to rotate. The rotation of the threaded rod 52 urges a threaded bearing 54, secured within a hole in the focal plane array mounting frame 48, to move forwardly or rearwardly thereby adjusting the focal length.

Rotation of the threaded rod 52 is facilitated by a bearing 56 provided on the forward mounting frame 58, to which the lens housing 46 is attached, and by a bearing, not shown, provided on the rear mounting frame 60 of the millimeter wave camera.

In the camera 20 of the present embodiment, the CCD camera 172 (FIG. 12) is provided to produce a separate image of objects in the field of view of the millimeter wave camera 20. The image generated by the CCD camera can be used by the operator for orientation while aiming the camera 20. The millimeter wave image can then be overlaid onto the CCD generated image to correspond millimeter wave images with the objects in the field of view. Alternatively, the millimeter wave image and the CCD generated image can be displayed on respective display devices. The millimeter wave images may also be viewed without the corresponding CCD generated image.

In FIG. 12 there is shown the partially exposed CCD camera housing 196. Within the CCD camera housing 196 there is a mounting shelf 198 onto which are mounted, the horn antenna 170 of the local oscillator 166, the CCD camera 172 and the noise generator 174 with associated horn antenna 176. A pair of terminals 200, 202 are provided on the noise generator 174 for driving the generator.

Referring now to FIGS. 1 and 2, the radiometric imaging processor 224 during normal operations executes an assembly language program independently of the host computer 222. In its idle mode, the radiometric imaging processor 224 waits and listens for commands from the host computer 222. Upon receiving such a command the radiometric imaging processor 224 executes the command and returns to the idle state.

The radiometric imaging processor contains subprograms for turning the reference load on and off, turning the noise source 174 (FIG. 1) on and off, resetting the logic needed to successively readout all of the pixel channels, and energizing the piezoelectric transducer assemblies 212 to change the position of the load switching twist reflector 38. When image data is being collected the radiometric imaging processor 224 controls the hardware devices to perform the following sequence of operations: turn on the load source and sample the image array; turn off the load source, turn on the noise source, and sample the image array; turn off the noise source and then calculate information for calibrating the individual antennas 64 of the focal plane array 30; step through the sixteen different load switching twist reflector 38 positions; sample the image array at each position, applying the calibration data; place the data from each position into its appropriate location in the final image; and place the final image in a buffer for export to a super resolution processor 226.

The data is transmitted from the radiometric imaging processor 224 to the super resolution processor 226 where the data is processed through an algorithm for improving resolution of the image. The image data output from the super resolution processor 226 is transmitted then to a video output device 228 for formatting to be output to the video display switching device 230. In addition to the millimeter wave data, data generated by the CCD camera 172 (FIG. 1) is also input to the output display switching device 230. The display switching device 230 controls the transmission of the millimeter wave image data and image generated by the CCD camera 172 to the video monitor 234 to output the data in one of three formats.

In the first format only the data generated by the CCD camera 172 is output and displayed by the video monitor 234. This format would normally be utilized by the operator for orienting the camera to bring the desired objects within the field of view of the camera 20. The second format is a composite format wherein the millimeter wave image data is overlaid on top of the data generated by the CCD camera 172. This second display format is utilized by the operator to coordinate the millimeter wave images to the objects in the field of view. Alternatively, the millimeter wave image data and the data generated by the CCD camera can be displayed on respective displaying devices. Finally, in the third display format the millimeter wave image data is output by itself. In addition to outputting the millimeter wave image data and image data generated by the CCD camera 172 to the video monitor 234, this image data may also be recorded separately on a pair of video recorder units 232 provided in the console.

When images are not being generated, flat fielding of the focal plane array 30 may be performed. In the present embodiment, normalization between channels is performed during one of eighteen subframes provided in the operational sequence of the millimeter wave camera system. During this subframe, the noise generator 174 is energized to generate a known signal to be transmitted to the focal plane array 30. The load switching twist reflector 38 is biased to transmit data from the field of view such that the data will not be reflected to the focal plane array 30. The output data from the focal plane array 30 is then transmitted to the host computer to be operated on by the radiometric imaging processor 224. The radiometric imaging processor 224 utilizes the output from the focal plane array 30 during the normalization subframe to adjust and normalize the gain between each of the antennas 64 of the focal plane array 30. A noise source bias power supply 236 and focal plane array bias power supply 148 are provided for supplying the noise generator 174 and focal plane array 30.

The auto focus range interface unit 240 utilizes the input from the ultrasonic detector 44 to determine the proper focal length from the lens 28 to the focal plane array 30. The auto focus range interface unit 240 then transmits this information to the motor controller 164 to energize the focusing motor thereby focusing the camera 20. Similarly, where the macro lens 208 is utilized, the auto focus range interface unit receives the input radiation signals from the macro lens 208 and utilizes these with the signals from the ultrasonic detector 44 to adjust the focus.

In addition to control signals transmitted from the host computer 222 via the millimeter wave camera input output ports 220, power for driving the various hardware components 242 of the camera 20 is provided from power supplies 244 provided in the console. Monitors 246 provided in the camera 20 track temperature and humidity of various components in the camera as well as the current in the focal plane array 30. If the temperature, humidity or current in the focal plane array 30 exceed predetermined limits, the monitors inform the host computer via control signals transmitted through the millimeter wave camera input output ports 220.

Where the current in the focal plane array 30 exceeds the predetermined value, dedicated hardware can limit the current or shut down operation of the camera 20. Where the temperature in the local oscillator 166, load switching twist reflector 38, focal plane array 30 or noise generator 174 exceed the predetermined values, dedicated hardware can direct the shut down operation of the camera 20.

An input device 252 is provided for the host computer to permit the operator to modify the operational parameters of the millimeter wave camera system. These operational parameters are monitored by the operator on a display device 254 provided for the host computer 222.

Figure 13:
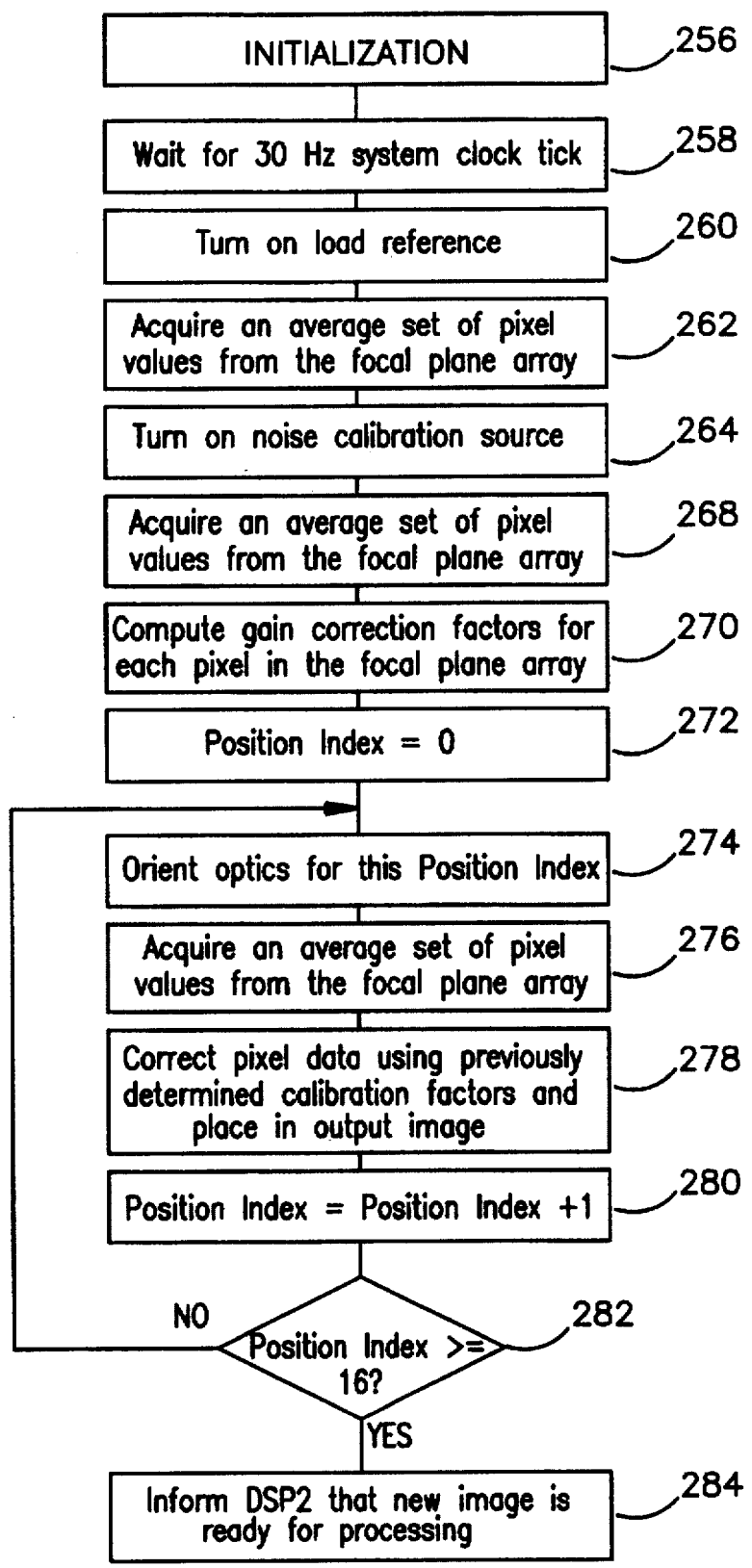
FIG. 13 is a functional flow chart of the software operation of the radiometric imaging processor of FIG. 2.

The software operation of the radiometric imaging processor 224 and super resolution processor 226 will now be described with reference to FIGS. 13 and 14, respectively. The image frame acquisition algorithm of the radiometric imaging processor will first be explained with reference to FIG. 13.

During initial power up of the radiometric imaging processor an initialization step 256 is performed whereupon the hardware devices of the millimeter wave camera imaging system are reset and various software variables are initialized. The software variables initialized are those indicating hardware states, the calibration variables for the image data, the variables indicating the data display options and the data analysis variables.

After initialization 256 the radiometric imaging processor waits for a system clock tick 258 before triggering the algorithm for acquiring an image frame. Thereafter, the radiometric imaging processor triggers the algorithm for acquiring an image frame on every 30 Hz system clock tick 258.

During image acquisition, the load switching twist reflector 38 is operated to reflect the load reference received from the field of view on to the focal plane array 260. An averaged set of pixel values is then obtained 262 from the focal plane array by sampling the focal plane array multiple times and averaging the results. In the millimeter wave camera of the present embodiment the focal plane array is sampled twice during the averaging step 262 but may, in other embodiments, be sampled up to six times.

Following the acquisition of the average set of pixel values 262, the noise generator 174 (FIG. 12) is biased to turn ON the noise calibration source 264. During the ON cycle of the noise generator, the load switching twist reflector 38 is operated to transmit the millimeter wave signals received from the field of view. An averaged set of pixel values for the noise calibration source is obtained 268 by sampling the focal plane array multiple times and averaging the results. In the millimeter wave camera of the present embodiment, the focal plane array is sampled twice during the averaging step 268 but may, in other embodiments, be sampled up to six times. The averaged noise calibration source pixel values obtained from the focal plane array are used to compute gain correction factors for each pixel of the focal plane array 270.

Following the computation of the gain correction factors 270, an image is generated from the combined output data generated from the images as reflected by the load switching twist reflector in each of the sixteen positions. In generating the image the register indicating the load switching twist reflector position is first set to zero 272. The load switching twist reflector is then oriented to the position associated with the value in the position indicating register 274, i.e. the zero position.

An averaged set of pixel values is then obtained 276 by sampling the focal plane array, with the load switching twist reflector in the position associated with register position zero, and then averaging these values with the sampled values generated over the previous sixty frames. The averaged set of pixel values is then corrected using the factors generated during the gain correction factor computation step 270 and the result is placed in an output image buffer 278.

The position indicating register is next incremented by one 280 and a query is performed to determine if the position indicating register value is greater than or equal to sixteen 282. If the value is less than sixteen, the load switching twist reflector is oriented to the position associated with the new value in the position indicating register 274. A new averaged set of pixel values is obtained 276 from the focal plane array with the load switching twist reflector in the new position and this new set of averaged pixel values is corrected and combined in the output image buffer 278. The position indicating register is again incremented by one 280.

This operational loop is performed for each of the sixteen positions of the load switching twist reflector and the output image is updated with the data generated for each of these positions. After the position indicating register has been incremented to fifteen and the image data has been generated with the load switching twist reflector in the sixteenth position, the position indicating register is incremented to sixteen. The radiometric imaging processor then transfers the composite image data from the output image buffer to a memory shared by the radiometric imaging processor and super resolution processor and set a flag to inform the super resolution processor that a new image is stored in memory and is ready for processing 284. The foregoing process, except for the initialization step 256, is performed every 30 Hz such that a new image is obtained every 1/30th of a second.

Figure 14:
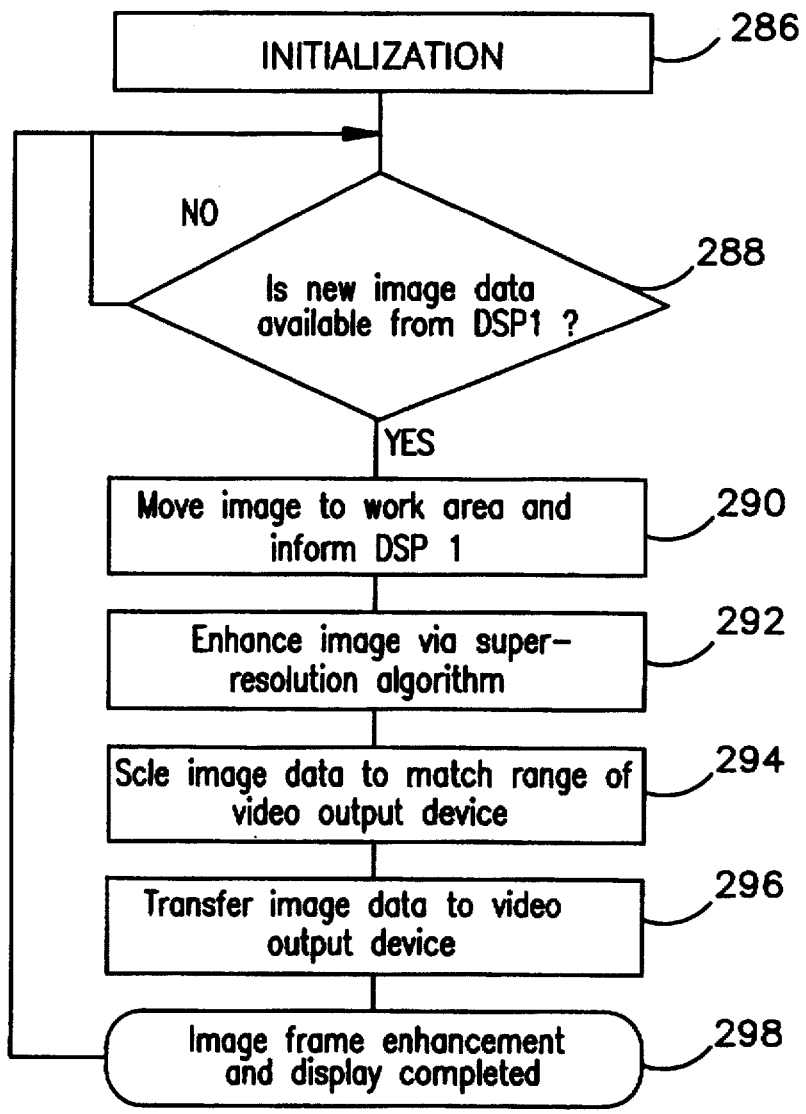
FIG. 14 is a functional flow chart of the software operation of the super resolution processor of FIG. 2.

Referring now to FIG. 14, an initialization step is performed in the super resolution processor during power on. During this initialization step 286 the software variables needed for the image enhancement processing are reset.

Following initialization, a query 288 is performed to determine if the flag has been set by the radiometric imaging processor indicating that new image data is available for processing. If no new data is available, the super resolution processor will continue to query for new data until data does become available.

When new image data becomes available the data is read out of the shared memory to a work area and a flag is set indicating to the radiometric imaging processor that the shared memory is available for new data 290. Until this flag is set the radiometric processor is prohibited from storing new data in the shared memory.

The image data written to the work area is processed in an image enhancing algorithm 292 to improve resolution. In the preferred embodiment of the present invention, the super resolution processor utilizes the "Fortran Source Code for 2 μm resolution techniques" software licensed from DRA, Farnbarough, England.

After the enhancement process, the image data is then scaled to match the range of the output device selected to output the data 294. The data is then transferred to the selected output device 296 and control returns to the query step 288 to await new image data for processing.

The above description and drawings are only illustrative of preferred embodiments which achieve the objects, features and advantages of the present invention, and is not intended that the present invention be limited thereto. Any modification of the present invention which comes within the spirit and scope of the following claims is considered part of the present invention.

What is new and desired to be protected by letters patent of the United States is:

1. A method of forming an image from millimeter waves, comprising the steps of:

receiving millimeter wave signals from a field of view at a first surface of a transreflector plate;

using said transreflector plate to filter said received signals to pass signals having a preselected polarization;

reflecting and rotating said polarized signals with a load switching twist reflector;

reflecting said rotated polarized signals from a second surface of said transreflector plate;

receiving said reflected rotated polarized signals at a radiation detector assembly;

scanning said load switching twist reflector to redirect said reflected rotated polarized signals onto said radiation detector assembly; and processing said reflected rotated polarized signals received by said radiation detector assembly to generate a first image.

2. The method of claim 1, wherein said scanning step is performed using positioning means for moving said load switching twist reflector.

3. The method of claim 2, wherein said positioning means are piezoelectric transducers.

4. The method of claim 1, 2 or 3, further comprising the step of providing multiple sets of image data for each scan of said load switching twist reflector.

5. The method of claim 1, 2 or 3, further comprising the step of adjusting the distance between said transreflector plate and said load switching twist reflector to focus said reflected rotated polarized signals received at said radiation detector assembly.

6. The method of claim 5, wherein said adjusting step is performed using an ultrasonic detector.

7. The method of claim 6, further comprising the step of band pass filtering said signals received from said field of view to pass signals within a preselected band.

8. The method of claim 7, wherein said preselected band is in the range 30 GHz to 300 GHz.

9. The method of claim 8, further comprising the step of focusing said band pass filtered signals with a lens.

10. The method of claim 9, wherein said radiation detector assembly is an array of radiation detectors.

11. The method of claim 10, further comprising the steps of receiving a local oscillated signal at said radiation detector assembly and heterodyning said reflected rotated polarized signals with said local oscillated signal.

12. The method of claim 11, further comprising the steps of generating a noise signal and receiving said noise signal at said radiation detector assembly.

13. The method of claim 12, further comprising the step of converting said reflected rotated polarized signals to digital signals representative of the amplitude of said signals.

14. The method of claim 13, wherein said locally oscillated signal is generated by a plurality of signal generators.

15. The method of claim 14, wherein said plurality of signal generators are locked in phase by injection locking.

16. The method of claim 15, wherein said preselected band is approximately 94 GHz and wherein the frequency of said locally oscillated signal is approximately 47 GHz.

17. The method of claim 16, wherein said load switching twist reflector changes the polarization of said polarized signals from linear to circular.

18. The method of claim 16, wherein said load switching twist reflector rotates the linear polarization of said polarized signals by ninety degrees.

19. The method of claim 1, further comprising the steps of generating a second image with a camera and displaying said first image and said second image.

20. The method of claim 19, wherein said first and second images are displayed on the same display device.

21. A millimeter wave imaging system, comprising:

a millimeter wave bandpass filter;

a transreflector having a polarized filtering first surface and a reflective second surface;

a layered load switching twist reflector having a reflecting layer and a polarization rotating layer;

means for moving said load switching twist reflector;

a radiation detector assembly; and means for forming a first image from signals received by said radiation detector assembly;

wherein said millimeter wave bandpass filter passes signals within a predetermined frequency, said first surface of said transreflector filters said bandpass filtered signals to pass signals of a predetermined polarization, said layered load switching twist reflector reflects and rotates said polarized signals, and said second surface of said transreflector reflects said rotated polarized signals; and wherein said radiation detector assembly receives and processes said reflected rotated polarized signals.

22. The imaging system of claim 21, wherein said means for moving comprises positioning elements mounted to said load switching twist reflector.

23. The imaging system of claim 22, wherein said positioning elements are piezoeletric transducers.

24. The imaging system of claim 23, further comprising spherical bearings for mounting said piezoelectric transducers to said load switching twist reflector.

25. The imaging system of claim 24, further comprising adjustment means for adjusting the distance between said transreflector and said load switching twist reflector.

26. The imaging system of claim 25, wherein said adjustment means includes an ultrasonic emitter and detector and means for moving said radiation detector assembly in response to the output of said ultrasonic emitter and detector.

27. The imaging system of claim 26, further comprising a lens, wherein said lens focuses said band passed signals.

28. The imaging system of claim 27, further comprising a local oscillator having an output antenna directed toward said radiation detector assembly.

29. The image system of claim 26, further comprising a camera for generating a second image and means for simultaneously displaying said first and second images.

30. The image system of claim 29, wherein said display means is a single display device.

31. The image system of claim 29, wherein said camera is spatially located within said bandpass filter.

32. The image system of claim 31, wherein said camera is spatially located at the center of said bandpass filter.

33. The imaging system of claim 21, wherein said predetermined frequency is in the range of 30 GHz to 300 GHz.

* * * * *